US008531959B2

(12) United States Patent
Wang et al.

(10) Patent No.: US 8,531,959 B2
(45) Date of Patent: Sep. 10, 2013

(54) METHOD FOR SENDING ACK

(75) Inventors: Yao Wang, Beijing (CN); Dongmei Lu, Beijing (CN)

(73) Assignee: IVT Technology Inc., Beijing (CN)

( * ) Notice: Subject to any disclaimer, the term of this patent is extended or adjusted under 35 U.S.C. 154(b) by 215 days.

(21) Appl. No.: 13/048,758

(22) Filed: Mar. 15, 2011

(65) Prior Publication Data

US 2011/0222447 A1    Sep. 15, 2011

Related U.S. Application Data

(63) Continuation of application No. PCT/CN2009/001039, filed on Sep. 17, 2009.

(51) Int. Cl.
H04L 12/56   (2011.01)
(52) U.S. Cl.
USPC .......................................... 370/235; 370/236
(58) Field of Classification Search
None
See application file for complete search history.

(56) References Cited

U.S. PATENT DOCUMENTS

| 7,290,195 | B2 * | 10/2007 | Guo et al. ...................... 714/749 |
| 7,672,247 | B2 * | 3/2010 | Gonzalez et al. ............. 370/252 |
| 7,924,749 | B2 * | 4/2011 | Ren et al. ....................... 370/278 |
| 2003/0043744 | A1 | 3/2003 | Lu et al. ........................ 370/236 |
| 2003/0081664 | A1 | 5/2003 | Lu et al. ........................ 375/222 |
| 2005/0005207 | A1 | 1/2005 | Herneque .................... 714/712 |
| 2005/0204247 | A1 * | 9/2005 | Guo et al. ..................... 714/746 |
| 2006/0268887 | A1 | 11/2006 | Lu et al. ........................ 370/394 |
| 2007/0195704 | A1 * | 8/2007 | Gonzalez et al. ............. 370/241 |
| 2008/0267141 | A1 * | 10/2008 | Ren et al. ...................... 370/337 |

FOREIGN PATENT DOCUMENTS

| CN | 1561615 A | 5/2005 |
| CN | 1741438 A | 1/2006 |
| CN | 101106531 A | 1/2008 |
| CN | 101193095 A | 4/2008 |
| WO | WO 2006/021159 A1 | 2/2006 |

OTHER PUBLICATIONS

Han, Chunyan et al., "TCP with demand-based ACK Mechanism in Ad Hoc," Computer Engineering, vol. 34, No. 11, pp. 123-125, Jun. 2008.

* cited by examiner

Primary Examiner — Jay P Patel
(74) Attorney, Agent, or Firm — Martine Penilla Group, LLP

(57) ABSTRACT

A method for sending an ACK from the receiver to the sender is disclosed. The receiver starts an ACK timer with the ACK timeout value being smaller than the RTX timeout value. The ACK timer is stopped or cancelled when an ACK is sent from the receiver to the sender. When the number of the delayed ACK for I-frames is close to the receive widow size of the receiver or the ACK timer is timeout, the receiver sends an ACK to the sender actively. When the receiver receives a Poll frame from the sender due to RTX retransmission timeout, the receiver sends an ACK to the sender passively. The receiver adjusts the ACK timeout value used next time based on the following: timeout value of a current ACK timer, RTX timeout value of the sender, the receive widow size of the receiver and the number of I-frames for which ACKs have not been sent, in order to reduce the S-frames and stops of data transmission, thus improving the data transmission speed and the bandwidth utilization.

10 Claims, 2 Drawing Sheets

METHOD FOR SENDING ACK

CLAIM OF PRIORITY

The present application claims priority under 35 U.S.C. §§120 and 365(c) as a continuation application of prior International Application No. PCT/CN2009/001039, which was filed on Sep. 17, 2009, and which was published under International Publication No. WO 2010/031249 A1 on Mar. 25, 2010, and was not published in English under PCT Article 21(2). The disclosure of the prior international application is incorporated herein by reference.

FIELD OF INVENTION

The present invention relates to communication technology, and particularly relates to a method and apparatus for sending ACK in Bluetooth communication.

BACKGROUND OF THE INVENTION

Bluetooth SIG officially released a new core supplementary specification (Core Spec 2.1 CSA1) containing eL2CAP (ERTM/SM mode) on Jun. 26, 2008. The most important change of the next generation Bluetooth core specification (Seattle version) is the introduction of AMP (alternative physical layer) architecture, which is an innovative wireless technology (RF) substitution rule. The new specification allows the Bluetooth protocol stack to choose proper wireless technology dynamically according to different tasks. In addition to the conventional Bluetooth 2.1+EDR, the new specification also provides support for high-speed transport layer such as 802.11 (WiFi). Bluetooth high-level protocols and applications are not required to make changes, thus ensuring a smooth upgrade of existing products during the update of Bluetooth core specification.

In the time of conventional Bluetooth controller, the Bluetooth controller is responsible for error correction and retransmission, and reliability of data transmission is ensured without the involvement of the host. Under the Bluetooth AMP architecture, the controller of high-speed transmission media is no longer responsible for the reliability of data transmission, and the host is required to provide the instant error correction and retransmission mechanism. However, traditional RT (retransmission)/FC (flow control) mode of the Bluetooth L2CAP has a design flaw; when a loss of packet is detected by the sender, all unresponsive frames have to be retransmitted, using no more than half of the transmission window. The core supplementary specification has an additional ERTM (Enhanced retransmission)/SM (stream) mode and has upgraded the original RT (retransmission)/FC (flow control) mode to fix the design flaw. The changes mainly focus on: providing additional SREJ (selective reject frame)/RNR (receiver not ready) control frame and providing additional Poll-Final bit field; when a loss of frame is detected, the sender first send inquiries about the current receiving status of the receiver by a RR (Poll=1) message and then decides the retransmission strategy to be used, so that extra transmission due to forced consecutive retransmission on detection of a loss of frame under RT model may be avoided, with full-window transmission and greatly increased speed compared to the maximum-half-window transmission in the RT model. The ERTM is still a slide window transmission model based on the transmission-response mechanism.

During the data transmission between the sender and the receiver, the data includes information frame (I-frame) and supervisory frame (S-frame). I-frame is used to transmit user data, and meanwhile carrying flow control and error control information to guarantee correct data transmission. S-frame is dedicated to transmit control information; when the flow control and error control information can not be carried by I-frame, S-frame is used. ACK (acknowledge) is a transmission control character sent from the receiver to the sender during the data transmission, which is used to acknowledge the correct reception of I-frame: on receipt of an ACK signal, the sender could then send the next group of frames; if the sender fails to receive ACK signal before RTX timeout occurs, it will retransmit the current data package or stop the data transmission. ACK can be carried by either I-frame or S-frame.

For the timing to send ACK response frame, there is no strict rules defined in specification; implementer could decide how to send ACKs. A conventional practice is to send ACKs when receiving an I-frame, whatever local have I-frame to send or not, which will decrease the transmission speed due to redundant transmission caused by too frequent ACKs. In contrast, if the ACK response is not established actively, the sender will wait for an RTX retransmission timeout to send Poll frame to inquire, which will cause passive ACK response from the receiver; in this case, the sender can not send any data before an ACK is received to clear unresponsive send window (send outstanding window), thus slowing down the transmission speed. Therefore, it has become a key point in realizing ERTM mode as to design an optimal ACK transmission mechanism, which can improve the data transmission speed.

SUMMARY OF THE INVENTION

Given the various disadvantages in conventional technology, a method, a system and a computer program and a computer readable medium storing the computer program for sending ACK in the Bluetooth eL2CAP specification are needed, in order to improve the data transmission speed by adapting dynamically to the transmission medium conditions and changes of transmission quality.

According to the first aspect of the present invention, it is provided a method for sending ACK used in a system comprising a sender and a receiver for transmitting data. When the receiver receives from the sender an I-frame for which an ACK is required, if there is an I-frame available at the receiver side, then the receiver piggybacks an ACK by the I-frame to the sender; otherwise the receiver sends an ACK to the sender by an S-frame. The receiver will send an ACK to the sender in one of the following three situations: timeout of the ACK timer, the difference between local receive widow size and the number of the delayed ACK for I-frames being smaller than a predetermined threshold; and on receipt of an inquiry by a Poll frame from the sender due to its RTX retransmission timeout. The method further includes: if there is an ACK timer that has been started, stopping or canceling the ACK timer when the receiver sends an ACK to the sender; increasing ACK timeout value used next time on determining that the ACK is sent from the receiver to the sender due to timeout of the ACK timer; and decreasing ACK timeout value used next time in at least one of the following situations: a) when it is determined that an ACK is sent from the receiver to the sender as difference between local receive widow size and the number of the delayed ACK for I-frames is smaller than a predetermined threshold; and b) when the ACK is sent from the receiver to the sender on receipt of an inquiry by a Poll frame from the sender due to its RTX retransmission timeout.

According to the second aspect of the present invention, it is provided a method for sending ACK used in a system comprising a sender and a receiver for transmitting data. When the receives an I-frame for which an ACK is required, if there is an I-frame available in local device, then the receiver piggybacks an ACK by the I-frame to the sender; otherwise, the receiver sends an ACK to the sender by an S-frame. When there is a first I-frame sent from the sender to the receiver for which ACK has not been sent, an ACK timer will be started at the receiver side, with the ACK timeout value being smaller than the RTX timeout value at the sender; and the ACK timer will be stopped or cancelled after the receiver sends an ACK to the sender; when the ACK timer is timeout, the receiver sends an ACK to the sender actively and increases the ACK timeout value used next time; when the number of the delayed ACK for I-frames is to reach receive widow size, the receiver sends an ACK to the sender actively and decreases the ACK timeout value used next time; when an ACK is sent from the receiver on receipt of an inquiry by a Poll frame from the sender due to RTX retransmission timeout, the receiver decreases ACK timeout value used next time.

For the ACK timer of the receiver, one method to set the ACK timer is that the receiver restarts the ACK timer each time it receives an I-frame, with the ACK timeout value being set smaller than RTX timeout value of the sender; the other way is that the receiver restarts the ACK timer only when the first I-frame for which ACK has not been sent becomes available at the receiver side, with the ACK timeout value being set smaller than the RTX timeout value.

Preferably, on receipt of an I-frame, the receiver records the frame number of the I-frame; the receiver records the frame number of the I-frame received from the sender and corresponding to the last ACK to the sender; and the receiver determines if there is any un-Acked I-frame and updates the un-Acked I-frame counter, by comparing the frame number of the received I-frame and the frame number of the I-frame corresponding to the last ACK to the sender.

As discussed above, if an ACK from the receiver to the sender can not be piggyback by an I-frame, the ACK has to be sent by an S-frame. S-frames transferred between the sender and the receiver should be kept as few as possible, to improve the data transmission speed of the I-frames. The receiver will have to send an ACK back in the following three situations:

1) when the ACK timer is timeout, the receiver sends an ACK to the sender actively. At this time, the sender has not sent a Poll frame to inquiry the receiving status of the receiver, which means that the ACK timeout value used next time can be further increased (the range of adjustment is a range between the current ACK timeout value and the RTX timeout value of the sender). In this way, the number of the delayed ACK for I-frames will increase by the timeout of the ACK timer, so the frequency of the S-frames sent due to the timeout of ACK timers will decrease thus reducing the transmission of S-frames.

2) when the number of the delayed ACK for I-frames nearly reaches receive widow size of the receiver, the receiver sends an ACK to the sender actively. As a result, if the receiver still does not send ACK to the sender by this time, the receiver will not be able to keep receiving data when the receiving window is full. Given that the ACK sent from the receiver to the sender needs a certain period of time to reach the sender, preferably, the ACK could be set to be sent before the receiving window is full. For example, a predetermined threshold could be set so that the difference between receive widow size and the number of the delayed ACK for I-frames is smaller than the predetermined threshold. For example, it can be set that when "the current number of the I-frames for which ACKs have not been sent $\geq$ the receive widow size -Th", with Th being a predetermined threshold, the receiver needs to send an ACK to the sender.

3) when the sender sends an inquiry of "the receiving status" by a Poll frame after it waits for RTX retransmission timeout, following the specification the receiver has to send an ACK back immediately to the sender; by that time, the ACK timer is probably not yet timeout. Since the Poll frame will delay the transmission of the I-frame on the sender side, the ACK timeout value used next time may be set to decrease, in order to send ACK back to the sender side actively so as to decrease the inquiries of Poll frames sent by the sender side.

When the ACKs have to be sent with S-frames from the receiver, the present invention provides a preferred solution: when the receiving window at the receiver side is about to be full, or the sender side is about to send an inquiry by Poll frame due to RTX retransmission timeout, the receiver side will send an ACK to the sender actively due to ACK timer timeout. This solution avoids the interruption of the transmission of I-frames caused by the full receiving window of the receiver or by the Poll frame sent from the sender due to RTX retransmission timeout; this solution also reduces the transmission of S-frame by increasing the number of the delayed ACK for I-frames the most possible. Therefore, the present invention provides a method for properly controlling the sending of ACK by adjusting the ACK timeout value at the receiver side. Preferably, the ACK timeout value used next time is a function of at least one of the following: current ACK timeout value, RTX timeout value of the sender, the receive widow size of the receiver and the number of I-frames for which ACKs have not been sent.

In one embodiment of the present invention, when the receiver sends an ACK to the sender due to the timeout of the ACK timer, the larger the number of the delayed ACK for I-frames is, the less the increasing magnitude of the ACK timeout value used next time is; when the receiver sends an ACK to the sender on receipt of the Poll frame from the sender after the RTX retransmission timeout, the larger the number of the delayed ACK for I-frames is, the less the decreasing magnitude of the ACK timeout value used next time is.

For example, when the number of the delayed ACK for I-frames is about to reach the receive widow size of the receiver, the receiver sends an ACK to the sender actively and decreases the ACK timeout value used next time; then, if, before receiving the ACK, the sender has sent a Poll frame to the receiver due to RTX retransmission timeout, the receiver has to send another ACK and decrease again the ACK timeout value used next time. To avoid adjusting of the ACK timeout value used next time over a too broad range, preferably, an average of timeout value of all started ACK timers is set, with the range of variation of the timeout value set around the average value. For example, the range of variation is set to be 80% to 120% of the average value. If the current ACK timeout value is smaller than upper limit of the range of variation, while the calculated ACK timeout value used next time is larger than the upper limit of the range of variation, then the receiver resets the ACK timeout value used next time for it to fall within the range of variation; for example, setting the timeout value to the upper limit. If the current ACK timeout value is larger than the lower limit of the range of variation, while the calculated ACK timeout value used next time is smaller than the lower limit of the range of variation, the receiver resets the ACK timeout value used next time to fall within the range of variation; for example, setting the timeout value to the lower limit. For example, the range of variation is set to be 80% to 120% of the average value; if the current ACK timeout value is larger than 80% of the average value while the calculated ACK timeout value used next time is smaller than 80% of the average value, the ACK timeout value used next time can be reset to 80% of the average value; and if the current ACK timeout value is smaller than 120% of the average value while the calculated ACK timeout value used next time is larger than 120% of the average value, the ACK timeout value used next time can be reset to 120% of the average value. In this way, the range of adjustment for the magnitude of the timeout value can be properly decreased to avoid unnecessary adjusting conflicts on the receiver side caused by the above three triggering events of sending ACK.

According to the third aspect of the present invention, it is provided a communication system, including a receiver side and a sender side for implementing the method for sending ACK as described above.

According to the fourth aspect of the present invention, it is provided a computer program product, containing instructions configured to enable a computing device to execute the steps of the method for sending ACK as described above.

According to the fifth aspect of the present invention, it is provided a computer readable medium, embodying the computer program product.

During the data transmission between a sender and a receiver, the transmission condition and the data transmission speed are subjected to antenna interference, noise interference, variation of communication distance and other factors. In the present invention, S-frames and transmission interruption can be decreased by adjusting dynamically the ACK timeout value on the receiver side to be dynamically adapted to the variation of the transmission condition, which improves the data transmission speed and bandwidth utilization. This invention is not limited to the mere situation that both the sender and the receiver dynamically adjust the timeout value of ACK timers to improve the data transmission speed respectively; if only the ACK timer on the receiver side is adjusted, the data transmission speed can be improved as well.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DESCRIPTION OF THE PREFERRED EMBODIMENTS

Figure 1:
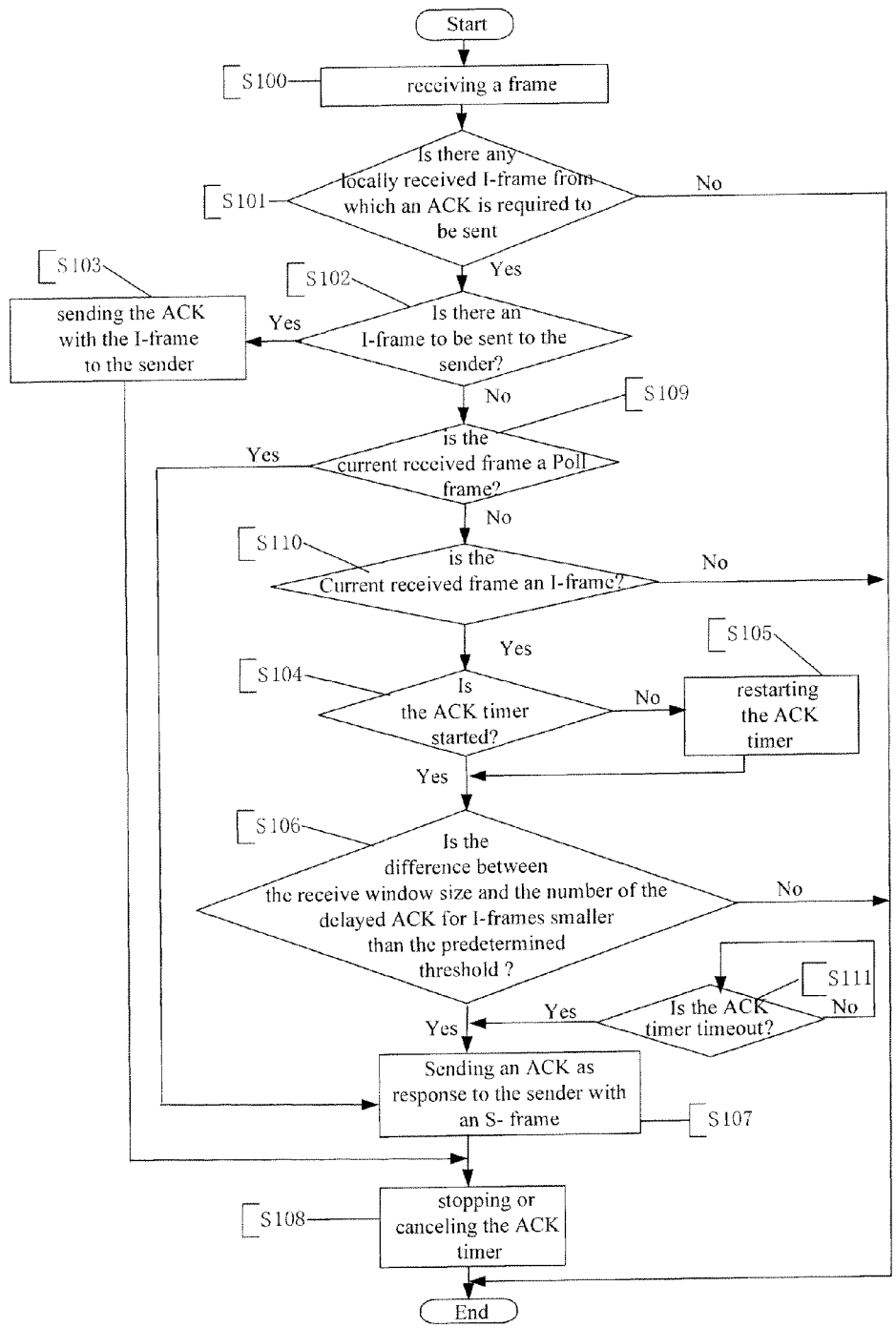
FIG. 1 is a flow diagram of a method for sending ACK from a receiver to a sender according to a preferred embodiment of the present invention.

FIG. 1 is a flow diagram of a method for sending ACK from a receiver to a sender according to a preferred embodiment of the present invention.

FIG. 1 illustrates a processing flow on the receiver side after a frame is received from the sender. At S100, the receiver receives a frame from the sender; in S101, determining if there is any locally received I-frame for which an ACK is required to be sent to the sender; in S102, if there is a received I-frame for which an ACK is required to be sent to the sender, then determining if there is any I-frame to be sent to the sender; if yes, then in S103, sending the ACK through the I-frame to the sender.

In S109, if there is a received I-frame for which an ACK is required to be sent to the sender, and meanwhile there is no I-frame to be sent from the receiver to the sender, determining if the current received frame is the Poll frame sent from the sender due to RTX retransmission timeout; if yes, then in S107 sending an ACK as response to the sender through an S-frame.

In S110, if the received frame from the sender at the receiver is not a Poll frame, then determining if the current received frame at the receiver is an I-frame; if yes, then in S104 determining if the ACK timer is started; if no, then in S105 restarting the ACK timer, the ACK timeout value being smaller than the RTX timeout value at the sender side. An alternative solution is: when having determined that the current received frame is an I-frame, the receiver restarts the ACK timer (i.e. the receiver restarts the ACK timer every time it receives an I-frame), to decreases the possibility of the timeout of the ACK timer.

Then, in S106, determining if the number of I-frames on the receiver side for which ACKs have not been sent back (i.e. the difference of the frame number of the current received I-frame and the frame number of the I-frame for which ACK has been sent) is to approximate the receive widow size of the receiver, i.e.: determining if the difference between the receive widow size and the number of the delayed ACK for I-frames is smaller than the predetermined threshold, (for example, determining if the number of the delayed ACK for I-frames is smaller than the receive widow size minus 1); if yes then at step S107, sending actively an ACK to the sender through an S-frame. In addition, in S111, determining if the ACK timer of the receiver is timeout; In S107, if yes then in step S111, sending actively an ACK to the sender.

In S108, after the receiver sends an ACK back to the sender (with I-frame or through S-frame), if there is an ACK timer, stopping or canceling the ACK timer.

Figure 2:
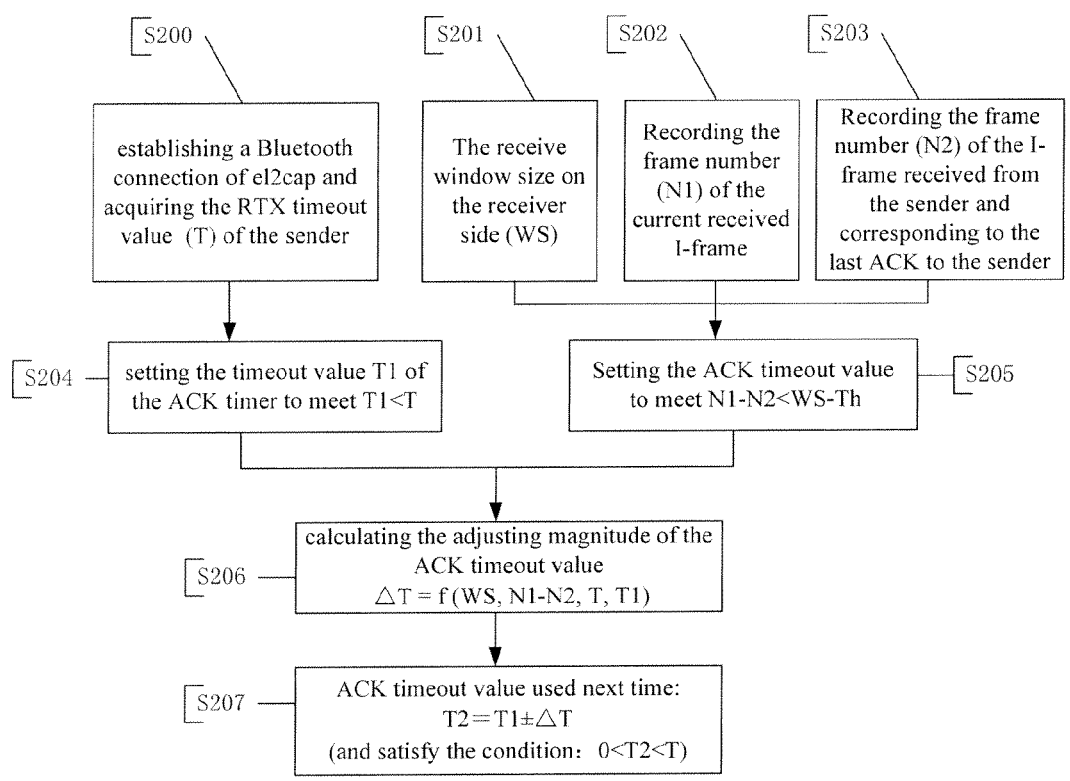
FIG. 2 is a schematical view of a sender adjusting timing (time) of an ACK timer according to another preferred embodiment of the present invention.

FIG. 2 is a schematical view of adjusting ACK timeout value of a receiver according to another preferred embodiment of the present invention.

Referring to FIG. 2, at S200 and S201, when a Bluetooth connection of e12cap is established between the sender-side and the receiver-side, the receiver acquires from the sender RTX timeout value (T) of the sender and records the receive window size on the receiver side (WS); the sender can acquire the receive widow size from the receiver. At S202, on receipt of an I-frame from the sender, the receiver records the frame number (N1) of the current received I-frame; and in S203, after sending an ACK to the sender, the receiver records the frame number (N2) of the received I-frame corresponding to the ACK to the sender. The receiver determines if there is any I-frame for which an ACK has not been sent back by comparing the frame number (N1) of the currently received I-frame and the frame number (N2) of the I-frame for which ACK has been sent; the receiver determines the number of I-frames on which ACKs have not been sent from the difference of N1 and N2.

At S204, timeout value (T1) of the ACK timer of the receiver is set according to the acquired RTX timeout value (T) of the sender. If the timeout value (T1) of the ACK timer is larger than RTX timeout value (T), then no ACK will be sent on it own initiative from the sender-side due to the timeout of the ACK timer, causing no ACK to be sent back until a Poll frame is sent for inquiry on a RTX retransmission timeout. As sending Poll frame inquiries will stop the transmission of I-frames on the sender side, the transmission speed is then decreased. Therefore, the condition of setting the ACK timeout value on the receiver side is: T1<T. Preferably, T1 is set to a value which is slightly smaller than T, such as 0.8 T.

When the difference of the frame number (N1) of the current received I-frames and the frame number (N2) of the I-frame for which ACK has been sent (i.e. the number of I-frames on the receiver side for which ACKs have not been sent) closely reaches (i.e. is close to) the window size (WS) of the receiving window on the receiver side, if the receiver still has not send an ACK actively to the sender, the sender will have to stop transmitting data when the receiving window of the receiver is full. Preferably, the receiver actively sends an ACK to the sender when N1−N2≧WS−Th (Th is a predetermined threshold, optionally, Th=1). Advantageously, at S205, the ACK timeout value is set so that N1−N2<WS−Th.

When the ACK timer experiences a timeout, by allowing the number of the delayed ACK for I-frames is mostly near to the receive widow size on the receiver side, the number of ACKs actively sent due to the timeout of the ACK timer can be decreased while reducing the transmission of S-frames can improve the transmission speed of the I-frames. Given that the transmission window size (WS) is fixed, when the ACK timer is timeout, the larger the number of I-frames (i.e. N1−N2) for which ACKs have not been sent is, meaning the closer the number of I-frames on which ACKs have not been sent is to the receive widow size, so the less the ACK timeout value that needs to be increased when it is to be started the next time is. Otherwise, when the ACK timer is timeout, the smaller the number of the delayed ACK for I-frames (i.e. N1−N2) is, the more ACK timeout value that needs to be increased when the timer is to be started the next time is.

When the ACK is sent from the receiver to the sender on receipt of an inquiry by a Poll frame from the sender due to RTX retransmission timeout, the timeout value (T2) of an ACK timer used next time can be decreased. The WS and RTX timeout value of the sender are fixed values, with the rule of setting the ACK timeout value being: when the receiving window of the receiver is becoming full or when the Poll frame is sent from the sender due to a RTX retransmission timeout that is about to happen, the receiver can send actively an ACK to the sender due to timeout of the ACK timer. When the receiver receives an inquiry by a Poll frame from the sender due to RTX retransmission timeout, the larger the number of the delayed ACK for I-frames (i.e. N1−N2) is, the closer the current time is to the timeout time of the ACK timer, which means that the ACK timeout value is properly set, and the less the magnitude of the ACK timeout value that needs to be decreased when the timer is to be started next time is; otherwise, when the receiver receives an inquiry by a Poll frame from the sender due to RTX retransmission timeout, the less the number of the delayed ACK for I-frames (i.e. N1−N2) is, the larger the magnitude of the ACK timeout value that needs to be decreased when the timer is to be started next time is.

If the receiver sends an ACK actively to the sender when "N1−N2≧WS−Th", it means that neither the current ACK timer nor the RTX of the sender is timeout, then the timeout value (T2) of an ACK timer used next time can be decreased.

In conclusion, in S206, the adjusting magnitude (ΔT) of the ACK timeout value used next time can be determined by "ΔT=f(WS, N1−N2, T, T1)" which is a function of the following parameters: current ACK timeout value (T1), RTX timeout value of the sender (T), the receive widow size of the receiver (WS) and the number of the delayed ACK for I-frames (i.e. N1−N2).

In a preferable embodiment, to avoid adjusting of the ACK timeout value used next time over a too broad range, an average value (AVR) of timeout value is set on the receiver side, which is the average of the ACK timeout value ever been. In addition, a range of variation of the timeout value is set with the average value (AVR) as a median. For example, the range of variation is set to be 80% to 120% of the average value (AVR). Then, the magnitude (ΔT) of the timeout value that is to be adjusted when an ACK timer is to be started next time has to also take consideration of the average value of timeout value of ACK timers (AVR), making ΔT a function of the current ACK timeout value (T1), RTX timeout value of the sender (T), the receive widow size of the receiver (WS), the number of the delayed ACK for I-frames (i.e. N1−N2) and the average of timeout value of ACK timers (AVR):ΔT=f(WS, N1−N2, T, T1, AVR), thus determining ΔT.

In S207, timeout value (T2) of an ACK timer used next time can be calculated according to the current ACK timeout value and the calculated adjusting magnitude of the timeout value. When the ACK timer is timeout, the receiver sends actively an ACK to the sender, and increases the timeout value (T2) of an ACK timer used next time (i.e. T2=T1+ΔT). Since the ACK timeout value satisfies: T2<T, the timeout value (T2) of an ACK timer used next time is between the current ACK timeout value and the RTX retransmission timeout of the sender (i.e. T1<T2<T). When the sender sends an ACK to the sender on receipt of an inquiry by a Poll frame from the sender due to the RTX retransmission timeout, the receiver decreases the timeout value (T2) of an ACK timer used next time (i.e. T2=T1−ΔT). Therefore, the timeout value (T2) of an ACK timer used next time is smaller than the current ACK timeout value (i.e. 0<T2<T1).

Although the present invention has been illustrated and described with reference to the preferred embodiments of the present invention, those ordinary skilled in the art shall appreciate that various modifications in form and detail may be made without departing from the spirit and scope of the invention.

The invention claimed is:

1. A method for sending ACK, used in a system including a sender and a receiver for transmitting data, said method comprising: when the receiver receives an I-frame from the sender that requires an ACK to be sent back to the sender,
   if the receiver has an I-frame to be sent to the sender, then sending, by the receiver, the ACK to the sender by the I-frame;
   otherwise, sending, by the receiver, the ACK to the sender by an S-frame;
   wherein the method further comprises:
   if there is an ACK timer that has been started, stopping or canceling the ACK timer when the receiver sends an ACK to the sender;
   increasing the ACK timeout value used next time when determining that the ACK is sent from the receiver to the sender due to timeout of the ACK timer; and
   decreasing the ACK timeout value used next time in at least one of the following situations:
   a) when determining that the ACK is sent from the receiver to the sender because difference between the receive window size and the number of the delayed ACK for I-frames is smaller than a predetermined threshold; and
   b) when the receiver sends the ACK back to the sender on receipt of a Poll frame from the sender.

2. The method for sending ACK of claim 1, wherein after receiving the I-frame, the receiver records the frame number of the I-frame;
   the receiver records the frame number of the I-frame received from the sender and corresponding to the last ACK to the sender, and
   the receiver determines if there is any un-Acked I-frame and updates the un-Acked I-frame counter, by comparing the frame number of the received I-frame and the frame number of the I-frame corresponding to the last ACK to the sender.

3. The method for sending ACK of claim 1, wherein the receiver restarts an ACK timer each time it receives an I-frame with the ACK timeout value which is smaller than the RTX timeout value of the sender.

4. The method for sending ACK of claim 1, wherein when there is a first I-frame for which ACK has not been sent, the receiver restarts the ACK timer with the ACK timeout value which is smaller than the RTX timeout value of the sender.

5. The method for sending ACK of claim 1, wherein the ACK timeout value used next time or the increasing or decreasing magnitude thereof is a function of at least one of the following: current ACK timeout value, RTX timeout value of the sender, receive window size of the receiver and delayed ACK for I-frames.

6. The method for sending ACK of claim 1, wherein when the receiver increases ACK timeout value used next time used next time due to timeout of the ACK timer, the increasing magnitude of timeout value decreases with increasing number of the delayed ACK for I-frames.

7. The method for sending ACK of claim 1, wherein when the receiver decreases ACK timeout value used next time due to the receipt of Poll frame from the sender, the decreasing magnitude of the timeout value decreases with increasing number of I-frames for which ACKs have not been sent.

8. The method for sending ACK of claim 1, wherein
calculating an average value of the ACK timeout value ever been, and setting a range of variation of the timeout value around the average value;
if current ACK timeout value is smaller than an upper limit of the range of variation, while a calculated ACK timeout value used next time is larger than the upper limit value of the range of variation, the receiver resets the ACK timeout value used next time for it to fall within the range of variation; and
if current ACK timeout value is larger than a lower limit of the range of variation, while a calculated ACK timeout value used next time is smaller than the lower limit of the range of variation, the receiver resets the ACK timeout value used next time for it to fall within the range of variation.

9. The method for sending ACK of claim 1, wherein ACK timeout value is set to satisfy that the difference between the receive window size and the number of the delayed ACK for I-frames is smaller than the predetermined threshold.

10. A communication system, comprising an apparatus for implementing the method as described in claim 1.

* * * * *